US011843896B2

(12) United States Patent
Agrawal

(10) Patent No.: US 11,843,896 B2
(45) Date of Patent: *Dec. 12, 2023

(54) MANAGE A VIDEO CONFERENCE SESSION IN A MULTI-TASKING ENVIRONMENT

(71) Applicant: Motorola Mobility LLC, Chicago, IL (US)

(72) Inventor: Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/701,042

(22) Filed: Mar. 22, 2022

(65) Prior Publication Data

US 2022/0303499 A1   Sep. 22, 2022

Related U.S. Application Data

(63) Continuation of application No. 17/209,157, filed on Mar. 22, 2021, now Pat. No. 11,297,281.

(51) Int. Cl.
*H04N 7/14* (2006.01)
*G10L 17/22* (2013.01)
*H04L 12/18* (2006.01)

(52) U.S. Cl.
CPC .............. *H04N 7/141* (2013.01); *G10L 17/22* (2013.01); *H04L 12/1822* (2013.01)

(58) Field of Classification Search
CPC ....... H04N 7/14; H04N 7/15; H04M 1/72519; H04M 3/56; H04M 2207/18; H04M 2250/62; H04L 12/18; H04L 12/1804; H04L 12/1813; H04L 12/1818; H04L 12/1822

(Continued)

(56) References Cited

U.S. PATENT DOCUMENTS 9,002,938 B2 *  4/2015  Bank .................. H04L 12/1822
                                                            709/204
9,843,673 B1   12/2017  Chug et al.

(Continued)

OTHER PUBLICATIONS

"Notice of Allowance", U.S. Appl. No. 17/209,157, filed Feb. 9, 2022, 8 pages.

(Continued)

*Primary Examiner* — Maria El-Zoobi
(74) *Attorney, Agent, or Firm* — FIG. 1 Patents

(57) ABSTRACT

In aspects of manage a video conference session in a multi-tasking environment, a computing device has a display screen to display a user interface of a foreground active application, such as a device application or a video conference session. The computing device implements a content control module that determines a user is designated as a participant of the video conference session, detects that a remote user connects to the video conference session from a remote device, and determines the device application is the foreground active application with the user interface of the device application displayed on the display screen. The content control module can then initiate to surface the user interface of the video conference session for display on the display screen responsive to the remote user connecting to the video conference session and the video conference session not being the foreground active application.

20 Claims, 6 Drawing Sheets

Figure 1:
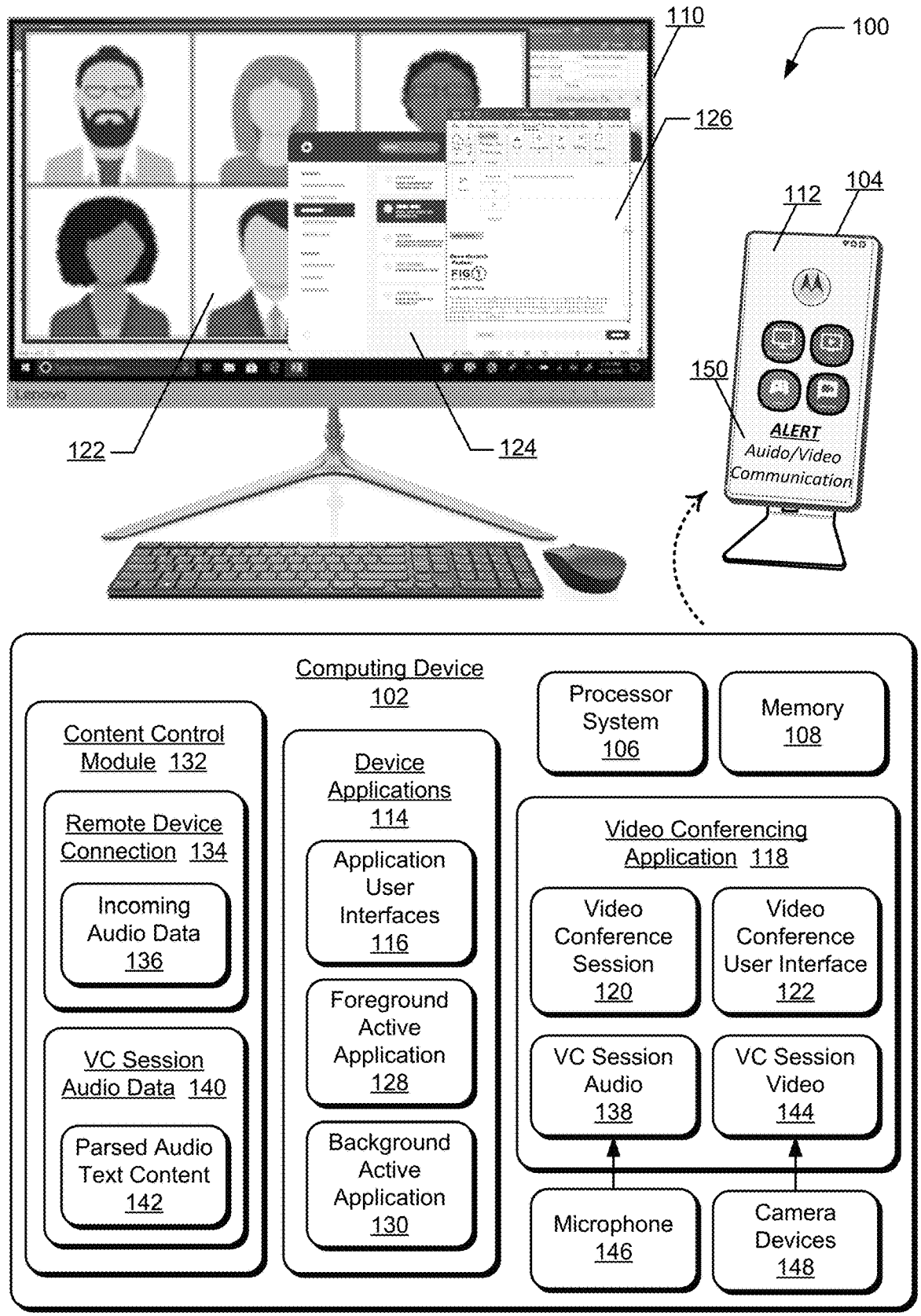

(58) Field of Classification Search
USPC .................................................. 348/14.02
See application file for complete search history.

(56) References Cited

U.S. PATENT DOCUMENTS

| | | | |
|---|---|---|---|
| 10,038,877 | B1 | 7/2018 | Faulkner et al. |
| 10,547,654 | B2* | 1/2020 | Faulkner ............. H04L 12/1827 |
| 11,297,281 | B1 | 4/2022 | Agrawal et al. |
| 2012/0278824 | A1 | 11/2012 | Patil et al. |
| 2013/0198654 | A1 | 8/2013 | Jones et al. |
| 2014/0040369 | A1 | 2/2014 | Jones et al. |
| 2015/0312185 | A1* | 10/2015 | Langholz .................. G06F 3/16 348/14.03 |
| 2015/0365306 | A1 | 12/2015 | Chaudhri et al. |
| 2016/0065894 | A1 | 3/2016 | Lin et al. |
| 2018/0013980 | A1* | 1/2018 | Oyman .................... H04N 7/15 |
| 2018/0203557 | A1 | 7/2018 | Kim |
| 2019/0364261 | A1* | 11/2019 | Hwang ............ H04N 21/85406 |
| 2020/0322395 | A1* | 10/2020 | Copley .................. H04N 7/157 |
| 2020/0336801 | A1* | 10/2020 | Harviainen .......... H04N 21/854 |
| 2021/0029326 | A1* | 1/2021 | Oyman .................... H04N 7/15 |
| 2021/0044982 | A1* | 2/2021 | Damnjanovic ........ H04W 16/10 |
| 2021/0306665 | A1* | 9/2021 | Hourunranta ........ H04N 13/111 |

OTHER PUBLICATIONS

U.S. Appl. No. 17/701,016, "Non-Final Office Action", U.S. Appl. No. 17/701,016, dated Dec. 20, 2022, 21 pages.

Agrawal, Amit Kumar, et al., "US Application as Filed", U.S. Appl. No. 18/110,473, filed Feb. 16, 2023, 61 pages.

U.S. Appl. No. 17/701,016, "Final Office Action", U.S. Appl. No. 17/701,016, dated Aug. 23, 2023, 12 pages.

U.S. Appl. No. 17/701,016, "Notice of Allowance", U.S. Appl. No. 17/701,016, dated Oct. 2, 2023, 9 pages.

* cited by examiner

MANAGE A VIDEO CONFERENCE SESSION IN A MULTI-TASKING ENVIRONMENT

RELATED APPLICATION

This application is a continuation of and claims priority to U.S. patent application Ser. No. 17/209,157 filed Mar. 22, 2021 entitled "Manage a Video Conference Session in a Multi-Tasking Environment," the disclosure of which is incorporated by reference herein in its entirety.

BACKGROUND

With the proliferation of the "work from home" lifestyle, video conferencing has rapidly expanded and become a primary means for many types of social, networking, meeting, and employment interactions. Generally, devices such as smart devices, mobile devices (e.g., cellular phones, tablet devices, smartphones), laptop computers, consumer electronics, and the like have become increasingly commonplace and used extensively to facilitate the everyday demands of video conferencing. Although quite useful for remote working, remote learning, and social distanced interactions, as well as simulating "in-person" communications that are lacking from the "work from home" lifestyle, it is inherently difficult to facilitate and maintain user engagement with video conferencing, and particularly, for extended periods of time.

In some instances, a user will connect to join a video conference session only to minimize and/or move the video conference user interface out of focus so as work on other tasks, such as reading and composing emails, or working on other projects. All too often, the user can become involved in the multi-tasking projects and forget they are connected to an active video conference session because the video conference user interface is no longer in focus as the foreground active application. In other instances, a user may start a video conference session a few minutes before a scheduled meeting, and similarly, become distracted with other projects and multi-tasking while waiting for others to join the video conference. Additionally, a user may mute the audio and/or deactivate the video for a video conference session, which only leads to more disconnect and a lack of awareness for participation in a video conference session. This lack of awareness can lead to awkward moments during a video conference, such as when a user is unaware of being called upon by another participant during the video conference, or when the user has forgotten that a meeting has started and others are waiting for the user to return their attention to the video conference session.

BRIEF DESCRIPTION OF THE DRAWINGS

Implementations of the techniques to manage a video conference session in a multi-tasking environment are described with reference to the following Figures. The same numbers may be used throughout to reference like features and components shown in the Figures:

FIG. 1 illustrates an example device and features in an environment to manage a video conference session in a multi-tasking environment in accordance with one or more implementations as described herein.

FIGS. 2-5 illustrate example methods to manage a video conference session in a multi-tasking environment in accordance with one or more implementations of the techniques described herein.

FIG. 6 illustrates various components of an example device that can be used to implement the techniques to manage a video conference session in a multi-tasking environment as described herein.

DETAILED DESCRIPTION

Implementations of techniques to manage a video conference session in a multi-tasking environment are described, and provide techniques that can be implemented by any type of computing devices, such as smart devices, mobile devices (e.g., cellular phones, tablet devices, smartphones, wireless devices), consumer electronics, and the like. Generally, a video conference call feature may be included as a device application in a wireless device, and can be initiated by a user who is utilizing the device to initiate or join a video conference session. When the video conference session is active, a user interface of the video conferencing application is displayed, such as on the display screen of the wireless device and/or on an extended display screen, such as for user interaction and viewing as a participant of the video conference session.

The user of the wireless device may be multi-tasking while participating in a video conference session, such as reading and composing email, reading the news via a web browser, and/or using any number of other device applications on the device. Accordingly, other application user interfaces may also be displayed over or along with the video conference user interface. The user interface of the foreground active application is generally displayed on top of, or over, the other displayed application user interfaces. If a user is multi-tasking while also participating in a video conference session, other displayed user interfaces, such as the video conference user interface, are associated with background active applications. For example, the user of the wireless device may start a video conference session, and then minimize the user interface so that the video conference session is ready to begin, but the video conferencing application is not the foreground active application on the device.

In aspects of the described techniques, the wireless device implements a content control module that can determine a user of the device is designated as a participant of a video conference session, which is running as a background active application on the device. The content control module can also detect that the user interface of the video conference session is replaced for display with an application user interface that is associated with a different device application, which is running as the foreground active application on the device. As noted above, the user of the wireless device may start a video conference session, and then minimize the video conference user interface while waiting for others to join the video conference.

The content control module can then detect that a remote user has connected to the video conference session based on a remote device connection, such as while the video conferencing application is running on the device as a background active application. In response to the remote user connecting to the video conference session, and determining that the video conferencing application is not the foreground active application on the device, the content control module can initiate to surface the video conference user interface of the video conference session for display, replacing another application user interface. When the user of the wireless device initiates starting the video conference session, but gets distracted with multi-tasking while waiting for others to join the video conference, this described technique surfaces the video conference user interface for display as a reminder to the user that someone else has now joined the video conference session. In implementations, the user may limit the features described herein for auto-surfacing the user interface of the video conference session, such as controlled with device settings so that the feature does not become a nuisance to the user who may not want to be interrupted while multi-tasking.

Alternatively, the user of the wireless device may be a participant in an active video conference session, but elect to multi-task and use other device applications to accomplish other projects or tasks, in which case the user may not hear or see all of the video conference that an active participant would likely attain. For example, the user may tune away from the video conference session and begin reading or composing email, begin reading the news via a web browser, and/or use any number of the other device applications on the device. The content control module is implemented to monitor the video conference session audio, and can detect in the audio data that the user is being addressed during the video conference. In implementations, the audio data of the video conference session is parsed into text content, and the user is detected as being addressed based on detecting an identity of the user from the text content of the parsed audio data.

In response to the user of the wireless device being addressed during the video conference session, and determining that the video conferencing application is not the foreground active application on the device, the content control module can initiate to surface the user interface of the video conference session for display, replacing another application user interface. When the user of the device tunes away from the video conference session, but is then called upon or addressed by name during the video conference, this described technique surfaces the video conference user interface for display as an alert or indication to the user that they are being addressed by a speaker in the video conference session.

In other implementations, the content control module may determine that the audio of the video conference session has been muted by the user of the wireless device, and/or the content control module may determine that the video for the video conference session has been deactivated. Similar to the user minimizing the video conference user interface while waiting for others to join the video conference, and/or the user multi-tasking and using other device applications while not fully paying attention to the video conference session, the user may also mute the video conference session audio and/or deactivate the video conference session video.

The content control module can then initiate to unmute the audio of the video conference session by turning on the device microphone (or a connected microphone). The content control module can also activate camera devices to capture the video of the user for display during the video conference session. For example, the content control module can unmute the audio and/or activate the camera devices to capture the video for the video conference session responsive to a remote user connecting to the video conference session, or the user being addressed during the video conference session, and determining that the audio of the video conference session has been muted and/or the video for the video conference session has been deactivated.

In other implementations, the content control module can detect outgoing audio communications of a video conference session from the wireless device while a user interface of another device application is the foreground active application displayed on the device. For instance, the content control module detects the outgoing audio communications of the video conference session while the user interface of the video conference session is not being displayed. The content control module can then initiate to display an alert to indicate that the video conference session is a background active application and the outgoing audio communication is being transmitted as an output of the video conference session. When the user of the wireless device tunes away from a video conference session and the video conference application is a background active application on the device, but the user leaves the audio and/or the video of the conference session activated, the user is alerted that audio and/or video communications are still being transmitted as an output of the video conference session.

While features and concepts of the described techniques to manage a video conference session in a multi-tasking environment can be implemented in any number of different devices, systems, environments, and/or configurations, implementations of the techniques to manage a video conference session in a multi-tasking environment are described in the context of the following example devices, systems, and methods.

FIG. 1 illustrates an example 100 of techniques to manage a video conference session in a multi-tasking environment, such as implemented with a computing device 102. In this example 100, the computing device 102 may be a wireless device 104, such as a smartphone, mobile phone, flip phone. Generally, the computing device 102 may be any type of an electronic, computing, and/or communication device, such as a computer, a laptop, a desktop computer, a tablet, a wireless device, and so forth. The computing device 102 can be implemented with various components, such as a processor system 106 and memory 108, as well as any number and combination of different components as further described with reference to the example device shown in FIG. 6. For example, the wireless device 104 can include a power source to power the device, such as a rechargeable battery and/or any other type of active or passive power source that may be implemented in an electronic, computing, and/or communication device.

In implementations, the wireless device 104 may be communicatively linked, either by a wired or wireless connection, to an extended display screen 110 on which digital image content can be displayed, as generated for display by the wireless device 104. For example, a user may join or initiate a video conference session using the wireless device 104, and utilize the larger sized extended display screen 110 for improved viewing and interaction during the video conference session. The wireless device 104 (e.g., as an example of the computing device 102) also includes a display screen 112, which may be a flat display screen or a curved display of the device.

The computing device 102 includes device applications 114, such as any type of messaging application, email application, video communication application, cellular communication application, music application, gaming application, media application, and/or any other of the many possible types of device applications. Many device applications 114 have an associated application user interface 116 that is generated and displayed for user interaction and viewing, such as on the display screen 112 of the wireless device 104 and/or on the extended display screen 110. Generally, an application user interface 116, or any other type of video, image, graphic, and the like is digital image content that is displayable on the display screen 112 of the wireless device 104 and/or on the extended display screen 110.

In this example 100, the device applications 114 include a video conferencing application 118, which a user of the computing device 102 can utilize to initiate or join a video conference session 120. When a video conference session 120 is active, a video conference user interface 122 of the video conferencing application 118 can be generated and displayed on the display screen 112 of the wireless device 104 and/or on the extended display screen 110, such as for user interaction and viewing as a participant of the video conference session 120. For instance, an example of the user interface 122 for a video conference session 120 is shown displayed on the extended display screen 110.

Further, more than one of the device applications 114 may be actively executing on the computing device 102, with the associated application user interfaces 116 being generated and/or displayed on the display screen 112 of the wireless device 104 and/or on the extended display screen 110. Notably, any of the multiple, active user interfaces 116 can be minimized, maximized, and/or overlapping for display, such as generally shown on the extended display screen 110, which includes more than one application user interface 116 being displayed. For example, a user of the wireless device 104 may be a participant in a video conference session 120, and the video conference user interface 122 is displayed on the extended display screen 110.

Additionally, the user of the device may be multi-tasking while participating in the video conference session 120, such as reading and composing email, reading the news via a web browser, and/or using any number of the other device applications 114 on the computing device 102. Accordingly, other application user interfaces 116 may also be displayed over or along with the video conference user interface 122 on the extended display screen 110, such as an email application user interface 124, a new email message 126, and/or any other various user interfaces 116 of the many device applications 114. Notably, the user interface of the foreground active application 128 is displayed on top of, or over, the other displayed application user interfaces, such as the new email message 126 of the email application, which is the foreground active application in this example. The other displayed application user interfaces 116, such as the video conference user interface 122, are associated with background active applications 130. For example, the user of the wireless device 104 may start a video conference session 120, and then minimize the user interface 122 so that the video conference session is ready to begin, but the video conferencing application 118 is not the foreground active application 128 on the device.

In this example 100, the computing device 102 implements a content control module 132, which may include independent processing, memory, and/or logic components functioning as a computing and/or electronic device integrated with the computing device 102. Alternatively or in addition, the content control module 132 can be implemented in software, in hardware, or as a combination of software and hardware components. In this example, the content control module 132 is implemented as a software application or module, such as executable software instructions (e.g., computer-executable instructions) that are executable with a processor (e.g., with the processor system 106) of the computing device 102 to implement the techniques and features to manage a video conference session in a multi-tasking environment, as described herein.

As a software application or module, the content control module 132 can be stored on computer-readable storage memory (e.g., the memory 108 of the device), or in any other suitable memory device or electronic data storage implemented with the module. Alternatively or in addition, the content control module 132 may be implemented in firmware and/or at least partially in computer hardware. For example, at least part of the modules may be executable by a computer processor, and/or at least part of the modules may be implemented in logic circuitry.

In aspects of the described techniques, the content control module 132 is implemented by the computing device 102, and can determine that a user of the device is designated as a participant of the video conference session 120, which is running as the background active application 130 executing on the device. The content control module 132 can also detect that the video conference user interface 122 of the video conference session 120 is replaced for display on the display screen 112 of the wireless device 104 and/or on the extended display screen 110 with an application user interface 116 that is associated with a different device application 114, which is running as the foreground active application 128 on the device. As noted above, the user of the wireless device 104 may start a video conference session 120, and then minimize the video conference user interface 122 while waiting for others to join the video conference.

The content control module 132 can detect that a remote user has connected to the video conference session 120 based on a remote device connection 134, such as while the video conference user interface 122 of the video conference session 120 is minimized and/or the video conferencing application 118 is running on the device as a background active application 130. In an implementation, the content control module 132 can process incoming audio data 136 of the video conference session 120, and detect that the remote user (e.g., via a remote device) has connected to the video conference session based on the incoming audio data, which includes an audio stream associated with the remote device. The content control module 132 can also determine that the video conference user interface 122 of the video conference session 120 is not being displayed on the display screen 112 of the wireless device 104 and/or on the extended display screen 110 when the remote user connects to the video conference session.

In response to the remote user connecting to the video conference session 120 (e.g., by the remote device connection 134), and determining that the video conferencing application 118 is not the foreground active application 128, the content control module 132 can initiate to surface the video conference user interface 122 of the video conference session 120 for display on the display screen 112 of the wireless device 104 and/or on the extended display screen 110, replacing the application user interface 116 of the device application 114. When the user of the wireless device 104 initiates starting the video conference session 120, but gets distracted with multi-tasking while waiting for others to join the video conference, this described technique surfaces the video conference user interface 122 for display as a reminder to the user that someone else has now joined the video conference session.

Alternatively, the user of the wireless device 104 may be a participant in an active video conference session 120, but elect to multi-task and use other device applications 114 to accomplish other projects or tasks, in which case the user may not hear or see all of the video conference that an active participant would likely attain. For example, the user may tune away from the video conference session 120 and begin reading or composing email, begin reading the news via a web browser, and/or use any number of the other device applications 114 on the wireless device 104. As above, the content control module 132 can also detect that the video conference user interface 122 of the video conference session 120 is replaced for display on the display screen 112 of the wireless device 104 and/or on the extended display screen 110 with an application user interface 116 that is associated with a different device application 114, which is running as the foreground active application 128 on the device.

The content control module 132 is implemented to monitor the video conference session audio 138, and can detect in the audio data 140 of the video conference session 120 that the user is being addressed during the video conference. In implementations, the video conference session audio data 140 of the video conference session 120 is parsed into text content 142, and the user is detected as being addressed based on detecting an identity of the user from the text content of the parsed audio data. In response to the user of the wireless device 104 being addressed during the video conference session, and determining that the video conferencing application 118 is not the foreground active application 128, the content control module 132 can initiate to surface the video conference user interface 122 of the video conference session 120 for display on the display screen 112 of the wireless device 104 and/or on the extended display screen 110, replacing the application user interface 116 of the device application 114. When the user of the wireless device 104 tunes away from the video conference session 120, but is then called upon or addressed by name during the video conference, this described technique surfaces the video conference user interface 122 for display as an alert or indication to the user that they are being addressed by a speaker in the video conference session.

In other implementations, the content control module 132 may determine that the audio 138 of the video conference session 120 has been muted by the user of the wireless device 104, and/or the content control module 132 may determine that the video 144 for the video conference session 120 has been deactivated. Similar to the user minimizing the video conference user interface 122 while waiting for others to join the video conference, and/or the user multi-tasking and using other device applications 114 while not fully paying attention to the video conference session, the user may also mute the video conference session audio 138 and/or deactivate the video conference session video 144.

The content control module 132 can then initiate to unmute the audio 138 of the video conference session 120 by turning on the device microphone 146 (or a connected microphone used for video conferencing). The content control module 132 can also activate the one or more camera devices 148 to capture the video 144 of the user for display during the video conference session. For example, the content control module 132 can unmute the audio 138 and/or activate the one or more camera devices 148 to capture the video 144 for the video conference session 120 responsive to a remote user connecting to the video conference session, or the user being addressed during the video conference session, and determining that the audio 138 of the video conference session 120 has been muted and/or the video 144 for the video conference session 120 has been deactivated.

In other implementations, the content control module 132 can detect outgoing audio communications of the video conference session 120 from the wireless device 104 while a device application user interface 116 of a device application 114 is the foreground active application 128 displayed on the display screen 112 of the wireless device 104 and/or on the extended display screen 110. For instance, the content control module 132 detects the outgoing audio communications of the video conference session 120 while the video conference user interface 122 of the video conference session 120 is not being displayed on the display screen 112 of the wireless device 104 and/or on the extended display screen 110. The content control module 132 can then initiate to display an alert 150, such as shown displayed on the display screen 112 of the wireless device 104, to indicate that the video conference session is a background active application 130 and the outgoing audio communication is being transmitted as an output of the video conference session. When the user of the wireless device 104 tunes away from the video conference session 120 and the video conference application 118 is a background active application 130, but the user leaves the video conference session audio 138 and/or the video conference session video 144 activated, the user is alerted that audio and/or video communications are still being transmitted as an output of the video conference session.

Example methods 200, 300, 400, and 500 are described with reference to respective FIGS. 2-5 in accordance with implementations to manage a video conference session in a multi-tasking environment, such as during device screen recording or during extended display screen recording. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 2:
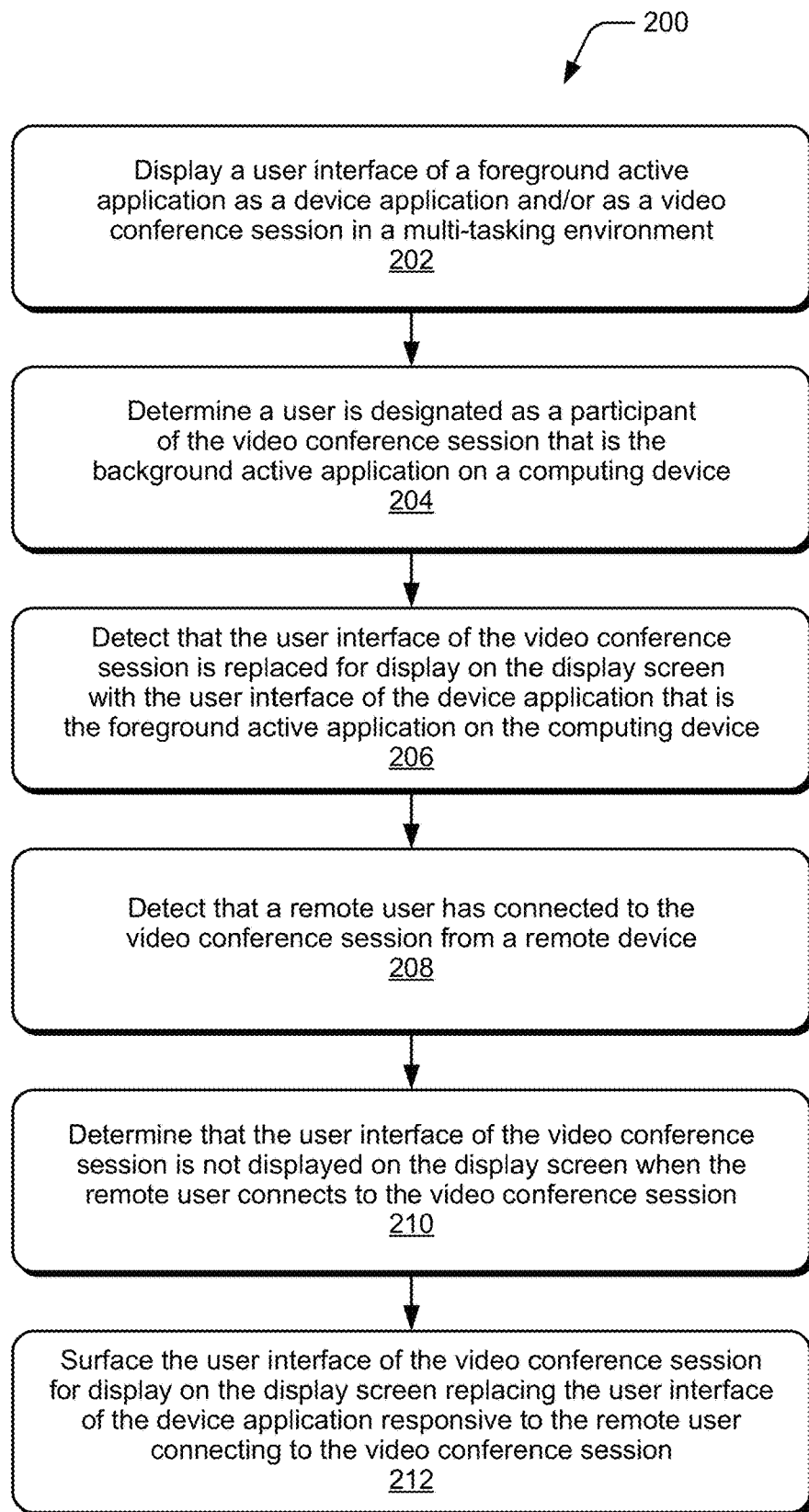

FIG. 2 illustrates example method(s) 200 to manage a video conference session in a multi-tasking environment, and is generally described with reference to a wireless device, as well as a content control module implemented by the device. The order in which the method is described is not intended to be construed as a limitation, and any number or combination of the described method operations can be performed in any order to perform a method, or an alternate method.

At 202, a user interface of a foreground active application is displayed as a device application and/or as a video conference session in a multi-tasking environment. For example, the display screen 112 of the wireless device 104 and/or on the extended display screen 110 displays a user interface of a foreground active application 128, which may be an application user interface 116 of a device application 114 and/or the video conference user interface 122 of the video conference session 120 in a multi-tasking environment.

At 204, a user is determined as being a designated participant of the video conference session that is the background active application on a computing device. For example, the content control module 132 implemented by the wireless device 104 determines that a user of the device is designated as a participant of the video conference session 120, which is the background active application 130 executing on the device.

At 206, the user interface of the video conference session is detected as being replaced for display on the display screen with the user interface of the device application that is the foreground active application on the computing device. For example, the content control module 132 implemented by the wireless device 104 detects that the user interface 122 of the video conference session 120 is replaced for display on the display screen 112 of the wireless device 104 and/or on the extended display screen 110 with the user interface 116 of the device application 114 that is the foreground active application 128 running on the device.

At 208, a remote user is detected as having connected to the video conference session from a remote device. For example, the content control module 132 implemented by the wireless device 104 detects that a remote user has connected to the video conference session 120 based on the remote device connection 134. In an implementation, the content control module 132 can process the incoming audio data 136 of the video conference session 120, and detect that the remote user has connected to the video conference session (e.g., as the remote device connection 134) based on the incoming audio data 136, which includes an audio stream associated with the remote device.

At 210, the user interface of the video conference session is determined as not being displayed on the display screen when the remote user connects to the video conference session. For example, the content control module 132 implemented by the wireless device 104 determines that the user interface 122 of the video conference session 120 is not being displayed on the display screen 112 of the wireless device 104 and/or on the extended display screen 110 when the remote user connects to the video conference session.

At 212, the user interface of the video conference session is surfaced for display on the display screen replacing the user interface of the device application responsive to the remote user connecting to the video conference session. For example, the content control module 132 implemented by the wireless device 104 surfaces the user interface 122 of the video conference session 120 for display on the display screen 112 of the wireless device 104 and/or on the extended display screen 110, replacing the user interface 116 of the device application 114 responsive to the remote user connecting to the video conference session.

Figure 3:
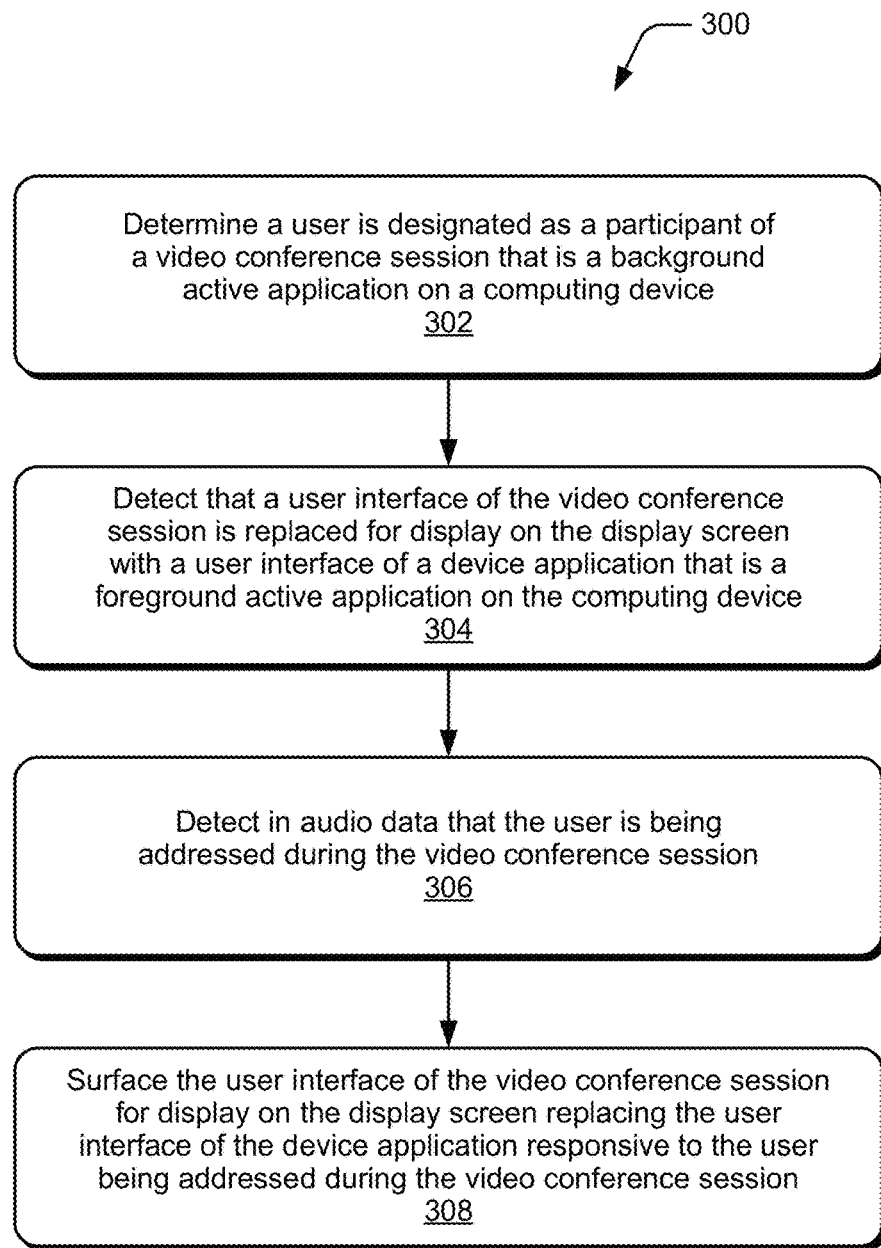

FIG. 3 illustrates example method(s) 300 to manage a video conference session in a multi-tasking environment, and is generally described with reference to a wireless device, as well as a content control module implemented by the device. The order in which the method is described is not intended to be construed as a limitation, and any number or combination of the described method operations can be performed in any order to perform a method, or an alternate method.

At 302, a user is determined as being a designated participant of the video conference session that is the background active application on a computing device. For example, the content control module 132 implemented by the wireless device 104 determines that a user of the device is designated as a participant of the video conference session 120, which is the background active application 130 executing on the device.

At 304, the user interface of the video conference session is detected as being replaced for display on the display screen with the user interface of the device application that is the foreground active application on the computing device. For example, the content control module 132 implemented by the wireless device 104 detects that the user interface 122 of the video conference session 120 is replaced for display on the display screen 112 of the wireless device 104 and/or on the extended display screen 110 with the user interface 116 of the device application 114 that is the foreground active application 128 running on the device.

At 306, audio data is detected to include the user being addressed during the video conference session. For example, the content control module 132 implemented by the wireless device 104 detects in the audio data 140 of the video conference session audio 138 that the user is being addressed during the video conference session. In implementations, the audio data 140 of the video conference session audio 138 is parsed into the text content 142, and the user is detected as being addressed based on detecting an identity of the user from the text content of the parsed audio data.

At 308, the user interface of the video conference session is surfaced for display on the display screen replacing the user interface of the device application responsive to the user being addressed during the video conference session. For example, the content control module 132 implemented by the wireless device 104 surfaces the user interface 122 of the video conference session 120 for display on the display screen 112 of the wireless device 104 and/or on the extended display screen 110, replacing the user interface 116 of the device application 114 responsive to the user being addressed during the video conference session.

Figure 4:
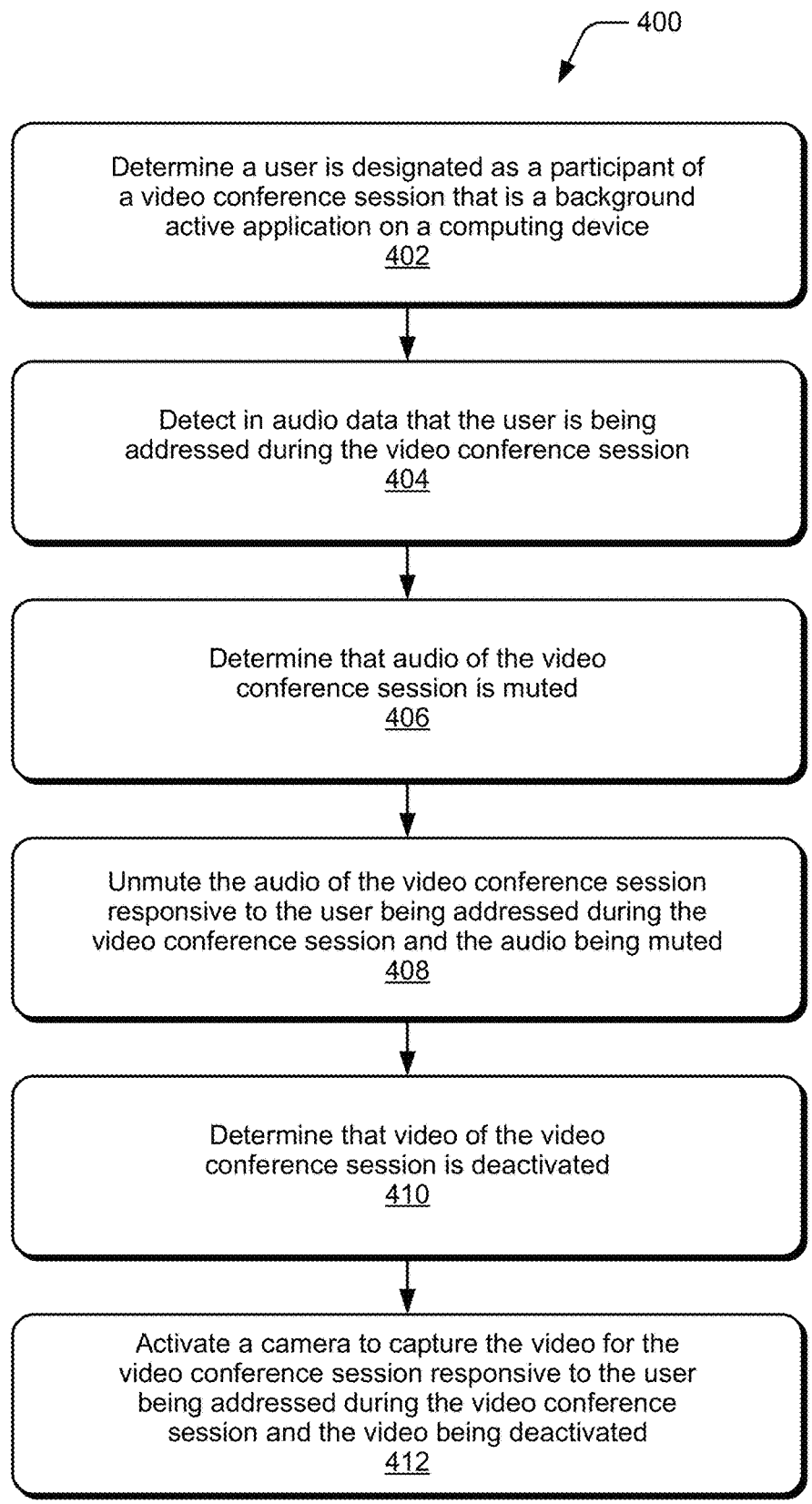

FIG. 4 illustrates example method(s) 400 to manage a video conference session in a multi-tasking environment, and is generally described with reference to a wireless device, as well as a content control module implemented by the device. The order in which the method is described is not intended to be construed as a limitation, and any number or combination of the described method operations can be performed in any order to perform a method, or an alternate method.

At 402, a user is determined as being a designated participant of the video conference session that is the background active application on a computing device. For example, the content control module 132 implemented by the wireless device 104 determines that a user of the device is designated as a participant of the video conference session 120, which is the background active application 130 executing on the device.

At 404, audio data is detected to include the user being addressed during the video conference session. For example, the content control module 132 implemented by the wireless device 104 detects in the audio data 140 of the video conference session audio 138 that the user is being addressed during the video conference session. In implementations, the audio data 140 of the video conference session audio 138 is parsed into the text content 142, and the user is detected as being addressed based on detecting an identity of the user from the text content of the parsed audio data.

At 406, the audio of the video conference session is determined to be muted. For example, the content control module 132 implemented by the wireless device 104 determines that the audio of the video conference session 120 is muted. At 408, the audio of the video conference session is unmuted responsive to the user being addressed during the video conference session and the audio being muted. For example, the content control module 132 implemented by the wireless device 104 initiates to activate the device microphone 146 so as to unmute the audio 138 of the video conference session 120 responsive to the user being addressed during the video conference and the determination that the audio is muted.

At 410, the video for the video conference session is determined to be deactivated. For example, the content control module 132 implemented by the wireless device 104 determines that the video for the video conference session 120 is deactivated. At 412, a camera is activated to capture video of the user for the video conference session responsive to the user being addressed during the video conference session and the video being deactivated. For example, the content control module 132 implemented by the wireless device 104 initiates to activate the one or more camera devices 148 of the device to capture the video 144 of the user for the video conference session 120 responsive to the user being addressed during the video conference session and the determination that the video is deactivated.

Figure 5:
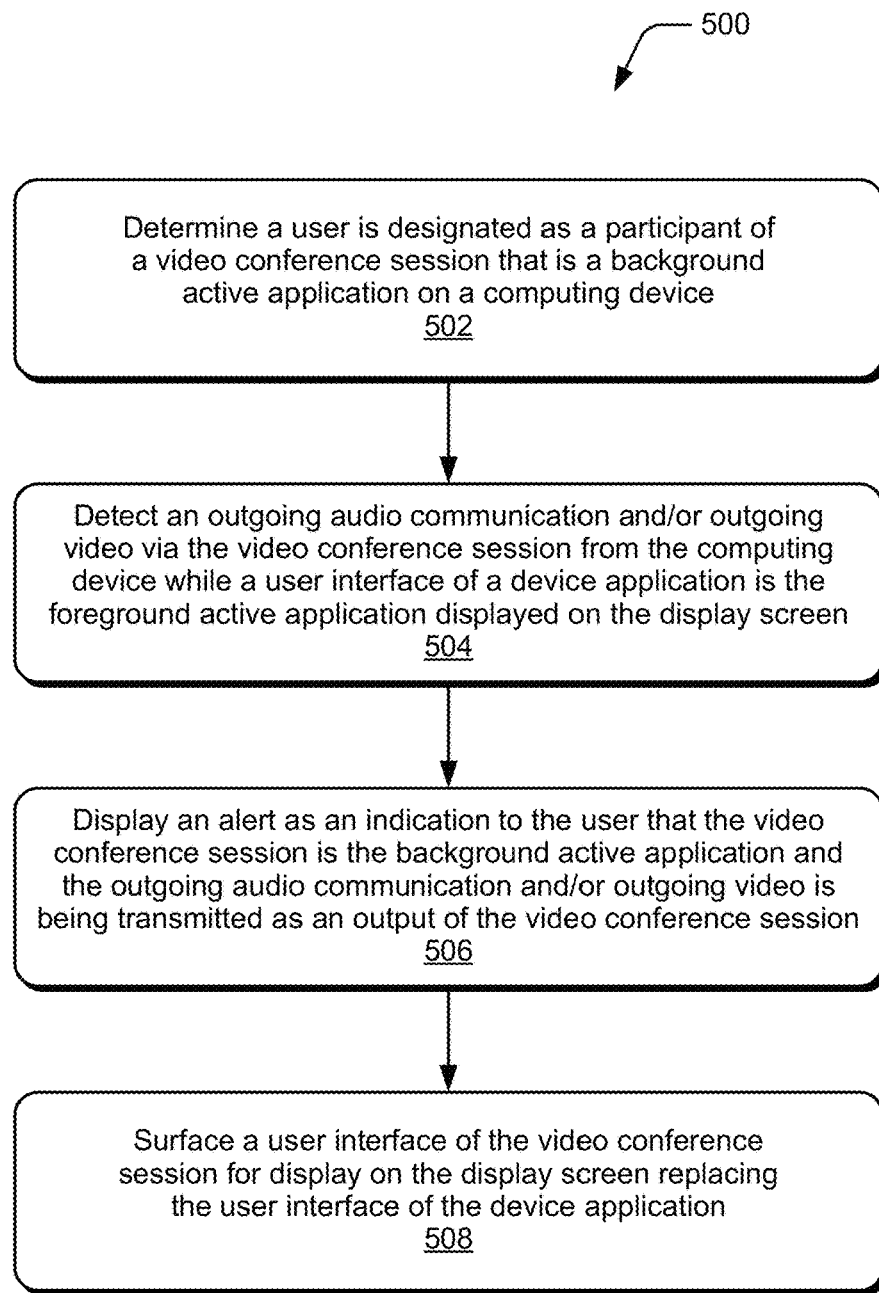

FIG. 5 illustrates example method(s) 500 to manage a video conference session in a multi-tasking environment, and is generally described with reference to a wireless device, as well as a content control module implemented by the device. The order in which the method is described is not intended to be construed as a limitation, and any number or combination of the described method operations can be performed in any order to perform a method, or an alternate method.

At 502, a user is determined as being a designated participant of the video conference session that is the background active application on a computing device. For example, the content control module 132 implemented by the wireless device 104 determines that a user of the device is designated as a participant of the video conference session 120, which is the background active application 130 executing on the device.

At 504, an outgoing audio communication and/or outgoing video of the video conference session from the computing device is detected while a user interface of a device application is the foreground active application displayed on the display screen. For example, the content control module 132 implemented by the wireless device 104 detects an outgoing audio communication and/or outgoing video of the video conference session 120 from the wireless device 104 while the user interface 116 of a device application 114 is the foreground active application 128 displayed on the display screen 112 of the wireless device 104 and/or on the extended display screen 110.

At 506, an alert is displayed for the user indicating that the video conference session is the background active application and the outgoing audio communication and/or outgoing video is being transmitted as an output of the video conference session. For example, the content control module 132 implemented by the wireless device 104 initiates to display the alert 150 as an indication to the user that the video conference session 120 is a background active application 130 and the outgoing audio communication and/or the outgoing video is being transmitted as an output of the video conference session.

At 508, the user interface of the video conference session is surfaced for display on the display screen replacing the user interface of the device application. For example, the content control module 132 implemented by the wireless device 104 surfaces the user interface 122 of the video conference session 120 for display on the display screen 112 of the wireless device 104 and/or on the extended display screen 110, replacing the user interface 116 of the device application 114.

Figure 6:
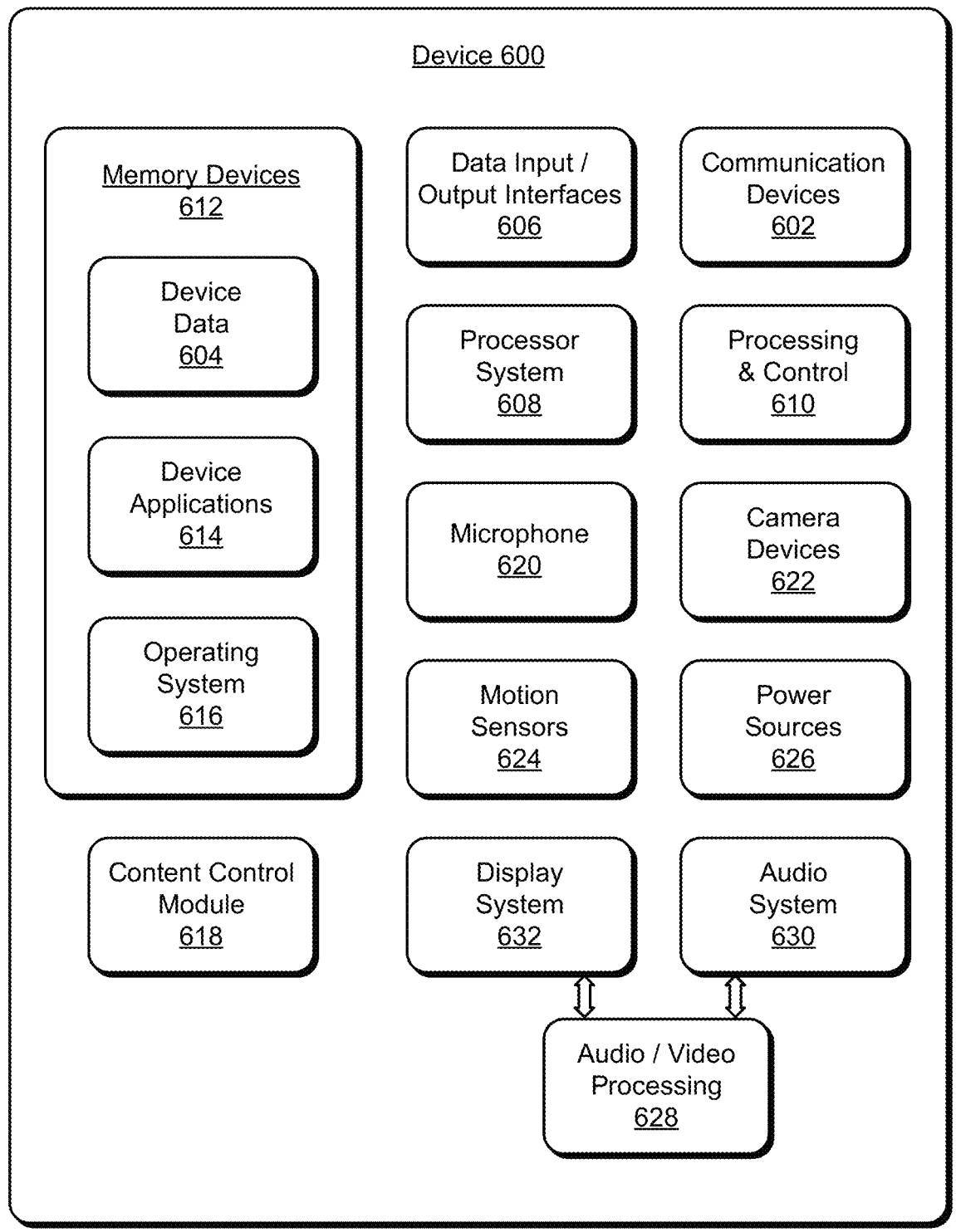

FIG. 6 illustrates various components of an example device 600, which can implement aspects of the techniques and features to manage a video conference session in a multi-tasking environment, as described herein. The example device 600 can be implemented as any of the devices described with reference to the previous FIGS. 1-5, such as any type of a wireless device, mobile device, mobile phone, flip phone, client device, companion device, paired device, display device, tablet, computing, communication, entertainment, gaming, media playback, and/or any other type of computing and/or electronic device. For example, the computing device 102 and/or the wireless device 104 described with reference to FIGS. 1-5 may be implemented as the example device 600.

The example device 600 can include various, different communication devices 602 that enable wired and/or wireless communication of device data 604 with other devices. The device data 604 can include any of the various devices data and content that is generated, processed, determined, received, stored, and/or communicated from one computing device to another. Generally, the device data 604 can include any form of audio, video, image, graphics, and/or electronic data that is generated by applications executing on a device. The communication devices 602 can also include transceivers for cellular phone communication and/or for any type of network data communication.

The example device 600 can also include various, different types of data input/output (I/O) interfaces 606, such as data network interfaces that provide connection and/or communication links between the devices, data networks, and other devices. The I/O interfaces 606 can be used to couple the device to any type of components, peripherals, and/or accessory devices, such as a computer input device that may be integrated with the example device 600. The I/O interfaces 606 may also include data input ports via which any type of data, information, media content, communications, messages, and/or inputs can be received, such as user inputs to the device, as well as any type of audio, video, image, graphics, and/or electronic data received from any content and/or data source.

The example device 600 includes a processor system 608 of one or more processors (e.g., any of microprocessors, controllers, and the like) and/or a processor and memory system implemented as a system-on-chip (SoC) that processes computer-executable instructions. The processor system 608 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 610. The example device 600 may also include any type of a system bus or other data and command transfer system that couples the various components within the device. A system bus can include any one or combination of different bus structures and architectures, as well as control and data lines.

The example device 600 also includes memory and/or memory devices 612 (e.g., computer-readable storage memory) that enable data storage, such as data storage devices implemented in hardware that can be accessed by a computing device, and that provide persistent storage of data and executable instructions (e.g., software applications, programs, functions, and the like). Examples of the memory devices 612 include volatile memory and non-volatile memory, fixed and removable media devices, and any suitable memory device or electronic data storage that maintains data for computing device access. The memory devices 612 can include various implementations of random-access memory (RAM), read-only memory (ROM), flash memory, and other types of storage media in various memory device configurations. The example device 600 may also include a mass storage media device.

The memory devices 612 (e.g., as computer-readable storage memory) provide data storage mechanisms, such as to store the device data 604, other types of information and/or electronic data, and various device applications 614 (e.g., software applications and/or modules). For example, an operating system 616 can be maintained as software instructions with a memory device 612 and executed by the processor system 608 as a software application. The device applications 614 may also include a device manager, such as any form of a control application, software application, signal-processing and control module, code that is specific to a particular device, a hardware abstraction layer for a particular device, and so on.

In this example, the device 600 includes a content control module 618 that implements various aspects of the described features and techniques to manage a video conference session in a multi-tasking environment. The content control module 618 can be implemented with hardware components and/or in software as one of the device applications 614, such as when the example device 600 is implemented as the computing device 102 and/or the wireless device 104 described with reference to FIGS. 1-5. An example of the content control module 618 includes the content control module 132 that is implemented by the computing device 102, such as a software application and/or as hardware components in the wireless device. In implementations, the content control module 618 may include independent processing, memory, and logic components as a computing and/or electronic device integrated with the example device 600.

The example device 600 can also include a microphone 620 and/or camera devices 622, as well as motion sensors 624, such as may be implemented as components of an inertial measurement unit (IMU). The motion sensors 624 can be implemented with various sensors, such as a gyroscope, an accelerometer, and/or other types of motion sensors to sense motion of the device. The motion sensors 624 can generate sensor data vectors having three-dimensional parameters (e.g., rotational vectors in x, y, and z-axis coordinates) indicating location, position, acceleration, rotational speed, and/or orientation of the device. The example device 600 can also include one or more power sources 626, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 600 can also include an audio and/or video processing system 628 that generates audio data for an audio system 630 and/or generates display data for a display system 632. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 600. Alternatively, the audio system and/or the display system are external, peripheral components to the example device.

Although implementations to manage a video conference session in a multi-tasking environment have been described in language specific to features and/or methods, the appended claims are not necessarily limited to the specific features or methods described. Rather, the specific features and methods are disclosed as example implementations to manage a video conference session in a multi-tasking environment, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A computing device, comprising: a display screen to display a user interface of a foreground active application including at least one of a device application or a video conference session in a multi-tasking environment; a content control module implemented at least partially in hardware and configured to: determine a user is designated as a participant of the video conference session that is active on the computing device; detect that a remote user connects to the video conference session from a remote device; determine the device application is the foreground active application and the user interface of the device application is displayed on the display screen; and initiate to surface the user interface of the video conference session for display on the display screen responsive to the remote user connecting to the video conference session and the video conference session not being the foreground active application.

Alternatively or in addition to the above described computing device, any one or combination of: the content control module is configured to determine that the user interface of the video conference session is not displayed on the display screen when the remote user connects to the video conference session. The content control module is configured to: detect that the user interface of the video conference session is displayed on the display screen responsive to the video conference session being initiated on the computing device; and detect that the user interface of the video conference session is replaced for display on the display screen with the user interface of the device application prior to the remote user connecting to the video conference session. The content control module is configured to: detect in audio data that the user is being addressed during the video conference session; and initiate to surface the user interface of the video conference session for display on the display screen responsive to the user being addressed and the video conference session not being the foreground active application. The audio data is parsed into text content and the content control module is configured to detect an identity of the user from the text content of the parsed audio data. The computing device further comprising: an audio module to process incoming audio data of the video conference session; and wherein the content control module is configured to detect the remote user connecting to the video conference session based on the incoming audio data including an audio stream associated with the remote device. The content control module is configured to: determine that audio of the video conference session is muted; and initiate to unmute the audio of the video conference session along with the user interface of the video conference session being surfaced for display on the display screen. The content control module is configured to: determine that video for the video conference session is deactivated; and initiate to activate a camera to capture the video for the video conference session along with the user interface of the video conference session being surfaced for display on the display screen.

A method, comprising: determining a user is designated as a participant of a video conference session that is a background active application on a computing device; detecting that a user interface of the video conference session is replaced for display on a display screen with a user interface of a device application that is a foreground active application on the computing device; detecting that a remote user has connected to the video conference session from a remote device; and surfacing the user interface of the video conference session for display on the display screen replacing the user interface of the device application responsive to the remote user connecting to the video conference session.

Alternatively or in addition to the above described method, any one or combination of: determining that the user interface of the video conference session is not displayed on the display screen when the remote user connects to the video conference session. The method further comprising detecting in audio data that the user is being addressed during the video conference session and surfacing the user interface of the video conference session for display on the display screen responsive to the user being addressed and the video conference session not being the foreground active application. The method further comprising parsing the audio data into text content and detecting an identity of the user from the text content of the parsed audio data. The method further comprising processing incoming audio data of the video conference session and detecting the remote user has connected to the video conference session based on the incoming audio data including an audio stream associated with the remote device. The method further comprising determining one or more of audio of the video conference session is muted and video for the video conference session is deactivated and initiating, along with the user interface of the video conference session being surfaced for display, one or more of unmuting the audio of the video conference session and activating a camera to capture the video for the video conference session.

A method, comprising: determining a user is designated as a participant of a video conference session that the user initiates, and the video conference session is a background active application on a computing device; detecting that a user interface of the video conference session is replaced for display on a display screen with a user interface of a device application that is a foreground active application on the computing device; detecting in audio data that the user is being addressed during the video conference session; and surfacing the user interface of the video conference session for display on the display screen replacing the user interface of the device application responsive to the user being addressed during the video conference session.

Alternatively or in addition to the above described method, any one or combination of: parsing the audio data of the video conference session into text content and the detecting that user is being addressed includes detecting an identity of the user from the text content of the parsed audio data. The method further comprising detecting that a remote user connects to the video conference session based on the audio data including an audio stream associated with a remote device and wherein the surfacing the user interface of the video conference session for display is further responsive to the remote user connecting to the video conference session. The method further comprising detecting at least one of an outgoing audio communication or outgoing video via the video conference session from the computing device while the user interface of the device application that is the foreground active application is displayed on the display screen, and displaying an alert as an indication to the user that the video conference session is the background active application and the outgoing audio communication or outgoing video is being transmitted as output of the video conference session. The method further comprising determining that audio of the video conference session is muted and initiating to unmute the audio of the video conference session along with the user interface of the video conference session being surfaced for display on the display screen. The method further comprising determining that video for the video conference session is deactivated and initiate to activate a camera to capture the video for the video conference session along with the user interface of the video conference session being surfaced for display on the display screen.

The invention claimed is:

1. A computing device, comprising:
   a display screen to display a user interface of a foreground active application including at least one of a device application or a video conference session;
   a content control module implemented at least partially in hardware and configured to:
      detect that a remote user connects to the video conference session from a remote device, and the video conference session is a background active application on the computing device;
      determine that audio of the video conference session is muted; and
      initiate to unmute the audio of the video conference session along with the user interface of the video conference session being surfaced for display on the display screen in response to the audio being muted and based on the remote user connecting to the video conference session.

2. The computing device of claim 1, wherein the content control module is configured to:
   determine that video for the video conference session is deactivated; and
   initiate to activate a camera to capture the video for the video conference session along with the user interface of the video conference session being surfaced for display on the display screen.

3. The computing device of claim 1, wherein the content control module is configured to determine that the user interface of the video conference session is not displayed on the display screen.

4. The computing device of claim 1, wherein the content control module is configured to:
   detect outgoing audio of the video conference session from the computing device while the user interface of the foreground active application displayed on the display screen is not the video conference session; and
   initiate to display an alert as an indication that the video conference session is the background active application and the outgoing audio is being transmitted as output of the video conference session.

5. The computing device of claim 1, wherein the content control module is configured to:
   detect outgoing video of the video conference session from the computing device while the user interface of the foreground active application displayed on the display screen is not the video conference session; and initiate to display an alert as an indication that the video conference session is the background active application and the outgoing video is being transmitted as output of the video conference session.

6. The computing device of claim 1, wherein the content control module is configured to:
detect in incoming audio data that a user is being addressed during the video conference session; and
initiate to surface the user interface of the video conference session for display on the display screen responsive to the user being addressed and the video conference session not being the foreground active application.

7. The computing device of claim 6, further comprising:
an audio module to process the incoming audio data of the video conference session from which the content control module detects that the user is being addressed during the video conference session.

8. A method, comprising:
detecting that a remote user connects to a video conference session from a remote device, and the video conference session is a background active application on a computing device;
determining that video for the video conference session is deactivated; and
activating a camera to capture the video for the video conference session along with a user interface of the video conference session being surfaced for display on a display screen in response to the video being deactivated and the remote user connecting to the video conference session.

9. The method of claim 8, further comprising:
determining that audio of the video conference session is muted; and
unmuting the audio of the video conference session along with the user interface of the video conference session being surfaced for display on the display screen.

10. The method of claim 8, further comprising:
determining that the user interface of the video conference session is not displayed on the display screen.

11. The method of claim 8, further comprising:
detecting outgoing audio of the video conference session from the computing device while a user interface of a foreground active application displayed on the display screen is not the video conference session; and
displaying an alert as an indication that the video conference session is the background active application and the outgoing audio is being transmitted as output of the video conference session.

12. The method of claim 8, further comprising:
detecting outgoing video of the video conference session from the computing device while a user interface of a foreground active application displayed on the display screen is not the video conference session; and
displaying an alert as an indication that the video conference session is the background active application and the outgoing video is being transmitted as output of the video conference session.

13. The method of claim 8, further comprising:
detecting in incoming audio data that a user is being addressed during the video conference session; and
surfacing the user interface of the video conference session for display on the display screen responsive to the user being addressed and the video conference session not being a foreground active application on the computing device.

14. The method of claim 13, further comprising:
processing the incoming audio data of the video conference session from which the audio data is detected that the user is being addressed during the video conference session.

15. A method, comprising:
detecting that a remote user connects to a video conference session from a remote device, and the video conference session is a background active application on a computing device;
detecting at least one of an outgoing audio or outgoing video of the video conference session from the computing device; and
displaying an alert as an indication that the video conference session is the background active application and the outgoing audio or the outgoing video is being transmitted as output of the video conference session in response to the remote user connecting to the video content session.

16. The method of claim 15, further comprising:
determining that a user interface of the video conference session is not displayed on a display screen of the computing device.

17. The method of claim 15, further comprising:
detecting in audio data that a user is being addressed during the video conference session; and
surfacing a user interface of the video conference session for display on a display screen responsive to the user being addressed during the video conference session.

18. The method of claim 17, further comprising:
parsing the audio data of the video conference session into text content; and
the detecting that the user is being addressed includes detecting an identity of the user from the text content of the parsed audio data.

19. The method of claim 15, further comprising:
determining that audio of the video conference session is muted; and
unmuting the audio of the video conference session along with a user interface of the video conference session being surfaced for display on a display screen.

20. The method of claim 15, further comprising:
determining that video for the video conference session is deactivated; and
activating a camera to capture the video for the video conference session along with a user interface of the video conference session being surfaced for display on a display screen.

* * * * *